(12) United States Patent
Hedayat et al.

(10) Patent No.: US 6,327,648 B1
(45) Date of Patent: Dec. 4, 2001

(54) MULTIPROCESSOR SYSTEM FOR DIGITAL SIGNAL PROCESSING

(75) Inventors: Shahin Hedayat, San Ramon; Surendra Mandava, San Jose, both of CA (US)

(73) Assignee: Cirrus Logic, Inc., Austin, TX (US)

( * ) Notice: Subject to any disclaimer, the term of this patent is extended or adjusted under 35 U.S.C. 154(b) by 1330 days.

(21) Appl. No.: 08/852,842

(22) Filed: May 7, 1997

Related U.S. Application Data

(63) Continuation of application No. 08/352,900, filed on Dec. 9, 1994, now abandoned.

(51) Int. Cl.[7] .................................................. G06F 9/00
(52) U.S. Cl. .................................................. 712/35
(58) Field of Search .................. 395/800.35, 800.34, 395/800.36; 304/724.01, 712, 741; 371/43; 375/3, 11

(56) References Cited

U.S. PATENT DOCUMENTS

| | | | |
|---|---|---|---|
| 5,418,976 | * | 5/1995 | Iida ....................................... 395/800 |
| 5,432,804 | * | 7/1995 | Diamondstein et al. .............. 371/43 |
| 5,440,504 | * | 8/1995 | Ishikawa et al. .................... 364/736 |
| 5,454,014 | * | 9/1995 | Blaker et al. ......................... 375/341 |
| 5,491,771 | * | 2/1996 | Gupta et al. ......................... 395/2.32 |
| 5,491,828 | * | 2/1996 | Intrater et al. ....................... 395/800 |
| 5,504,784 | * | 4/1996 | Niyogi et al. ........................ 375/341 |
| 5,550,870 | * | 8/1996 | Blaker .................................. 375/341 |

FOREIGN PATENT DOCUMENTS

0442041  *  8/1994  (EP).

OTHER PUBLICATIONS

Falik et al. "NSC's Digital Answering Machines Solutions"; IEEE 10/92.*
Intrater et al. "Application Specific Microprocessors" IEEE; 1990.*

\* cited by examiner

*Primary Examiner*—Larry D. Donaghue
(74) *Attorney, Agent, or Firm*—McDermott, Will & Emery; Steven Lin

(57) ABSTRACT

A novel multi-DSP system allows a main DSP to operate concurrently with an auxiliary DSP for implementing a filter algorithm. The main DSP and auxiliary DSP have separate program memories but share the same data memory. The auxiliary DSP program memory is mapped to the main DSP program memory to allow the main DSP to download filter process instructions from its program memory into the auxiliary DSP program memory. The auxiliary DSP fetches the instructions from its program memory to execute them. The auxiliary DSP is prevented from access to the shared data its program memory when this memory is occupied by the main DSP. An arbitration mechanism gives the auxiliary DSP access to the data memory only when the main DSP is not using this memory.

18 Claims, 5 Drawing Sheets

MULTIPROCESSOR SYSTEM FOR DIGITAL SIGNAL PROCESSING

This application is a continuation of application Ser. No. 08/352,900 filed Dec. 9, 1994, now abandoned.

TECHNICAL FIELD

This invention relates to digital signal processors, and more specifically, to a multiprocessor system for implementing digital signal processing algorithms.

BACKGROUND ART

Digital signal processing is concerned with the representation, transformation, and manipulation of digital signals and the information they contain. Digital signal processors play a major role in such diverse fields as speech and data communication, biomedical engineering, acoustics, sonar, radar, seismology, oil exploration, instrumentation, robotics, consumer electronics, and many others. They can implement a wide range of digital signal processing algorithms including companding, filtering, Fast Fourier Transforms, and control algorithms.

Filters are a particularly important class of digital signal processors. A filter digital signal processor (DSP) can be defined as a system that implements a frequency-selective filtering algorithm to pass certain frequency components and reject all others. In a broader context, a filter DSP provides modification of certain frequency components relative to others.

Referring to FIG. 1, shown is an example of a conventional single chip digital signal processor that can implement various signal processing algorithms. The DSP chip, which in this example is a TMS320C2x, manufactured by Texas Instruments, Inc., uses a Harvard-type architecture that maximizes processing power by maintaining two separate memory bus structures, program and data, for full-speed execution. Instructions are included to provide data transfers between the program and data memory spaces. Externally, the program and data memory are multiplexed over the same bus so as to maximize the address range for both spaces while minimizing the pin count of the DSP chip.

The TMS320C2x chip comprises two large on-chip data RAM blocks 32 and 34 (a total of 544 16-bit words), one of which (block 32) is configurable either as a program or data memory. Programs of up to 4K words can be masked into an internal program ROM 36. A multiplier 38 performs a 16×16-bit 2s-complement multiplication with a 32-bit result in a single instruction cycle. Multiplier values come from the data memory or from the program memory, or immediately from an instruction word.

The TMS320C2x performs 2s-complement arithmetic using a 32-bit arithmetic logic unit (ALU) and accumulator (ACC) 40. The ALU is a general-purpose arithmetic unit that operates using 16-bit word taken from data RAM or derived from immediate instructions, or using the 32-bit result of the multiplier. The accumulator stores the output from the ALU and is the second input to the ALU. Instructions are provided for storing the accumulator words in the data memory.

A scaling shifter 42 has a 16-bit input connected to the data bus and a 32-bit output connected to the ALU. The scaling shifter produces a left-shift of 0 to 16 bits on the input data, as programmed in the instruction. Shift capabilities enable the processor to perform numerical scaling, bit extraction, extended arithmetic, and overflow prevention.

The DSP internal memory interface consists of a 16-bit parallel data bus 44, a 16-bit address bus 46 and pins for various control signals. All control operations are supported by a 16-bit timer 48. A serial interface 50 provides direct communications with serial devices such as codecs and serial A/D converters.

A multiprocessor interface 52 can be used between the TMS320C2x processors in multiprocessing applications. External user interrupts to control the DSP can be provided through an interrupt bus 54.

A DSP efficiently implements many application-oriented digital signal processing programs. Some of these programs, for example, a filter program, occupy a small amount of the program space but run repeatedly for long durations of time, and, therefore, require a substantial portion of the processor bandwidth. It would be desirable to utilize multiprocessor architecture to improve DSP performance.

However, adaptation of DSP to a multiprocessing environment has encountered particular problems, as will now be discussed.

Referring to FIG. 2, a conventional multiprocessor system comprises a plurality of processors 70 having their own instruction and data streams from corresponding memories 80. Each processor 70 can execute its own job instruction stream independently of the other processors when no interaction with another processor is required. However, in an implementation wherein one of the processors assigns some of its tasks to another processor, synchronization between the processors is required. Such syncronization is usually accomplished using memory-based locking techniques. The basic principle is that only one access to any memory location can occur in any memory cycle. As a result, substantial bottlenecks are created during communications between processors.

It would be desirable to provide a data and program memory arrangement in a multiprocessor system that reduces communication bottlenecks inherent in a multiprocessor architecture. It would also be desirable to adopt the resulting architecture to a DSP system.

SUMMARY OF THE INVENTION

In accordance with the present invention, a multiprocessor system having an auxiliary DSP for carrying out filter processing operations is proposed. This multiprocessor arrangement substantially improves speed of digital signal processing in comparison with a single-processor DSP.

Accordingly, one advantage of the invention is in providing a DSP system able to efficiently perform time-consuming operations.

Another advantage of the invention is in providing an auxiliary DSP for implementing specific signal processing operations to allow a main DSP to support other tasks.

A further advantage of the invention is in providing concurrent operations of the main and auxiliary DSPs to improve the speed of digital data processing.

A further advantage of the invention is in providing a data and program memory arrangement in a multiprocessor system that reduces communication bottlenecks inherent in a multiprocessor architecture.

The above and other advantages of the invention are achieved, at least, in part, by providing a multiprocessor computer system having a main digital signal processor (DSP) and at least one auxiliary DSP that assists the main DSP in executing its digital signal processing operations. The main DSP and auxiliary DSP share a common data memory and have separate program memories. The auxiliary DSP program memory is physically mapped to the main DSP program memory to enable the main DSP to download processing instructions from its program memory into the auxiliary DSP program memory.

In accordance with one aspect of the invention, the auxiliary DSP carries out filter process operations.

The main DSP program memory may be arranged at a main DSP chip. The auxiliary DSP program memory may be arranged at an auxiliary DSP chip. The data memory also may be arranged at the auxiliary DSP chip. A program sequence unit enables the main DSP to access the auxiliary DSP program memory for writing the processing instructions, and enables the auxiliary DSP to access the auxiliary DSP program memory for reading the processing instructions.

In accordance with the method of this invention, the main DSP downloads processing instructions from the main DSP memory to the auxiliary DSP memory and enables the auxiliary DSP to fetch them to provide their execution. Preferably, the main DSP supplies to the auxiliary DSP a start address in the auxiliary DSP program memory from which to begin execution of the processing instructions. Alternatively, the main DSP may supply to the auxiliary DSP a control signal to start execution of the processing instructions from a predetermined location in the auxiliary DSP program memory.

In accordance with another aspect of the invention, the auxiliary DSP supplies to the main DSP an interrupt to indicate that the operations are completed. Alternatively, the main DSP may check a status signal provided by the auxiliary DSP to determine whether the operations are completed.

The method and apparatus of the invention, using an auxiliary DSP that shares a data memory with a main DSP and has a program memory physically mapped to a program memory of the main DSP, thus increase efficiency of a DSP system for performing time-consuming operations, and reduce communication bottlenecks inherent in a multiprocessor architecture. The auxiliary DSP executes some of the time-consuming operations to allow the main DSP to concurrently support other tasks. As a result, computational speed of the DSP system is substantially increased.

Still other advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

DETAILED DESCRIPTION

Although the invention has general applicability in the field of multiprocessor systems, the best mode for practicing the invention is based in part on the realization that the auxiliary processor is a filter DSP optimized for running filter programs for modem application. It is to be understood that the invention is applicable to a multi-DSP system of any architecture, wherein an auxiliary DSP of any type is provided.

Figure 1:
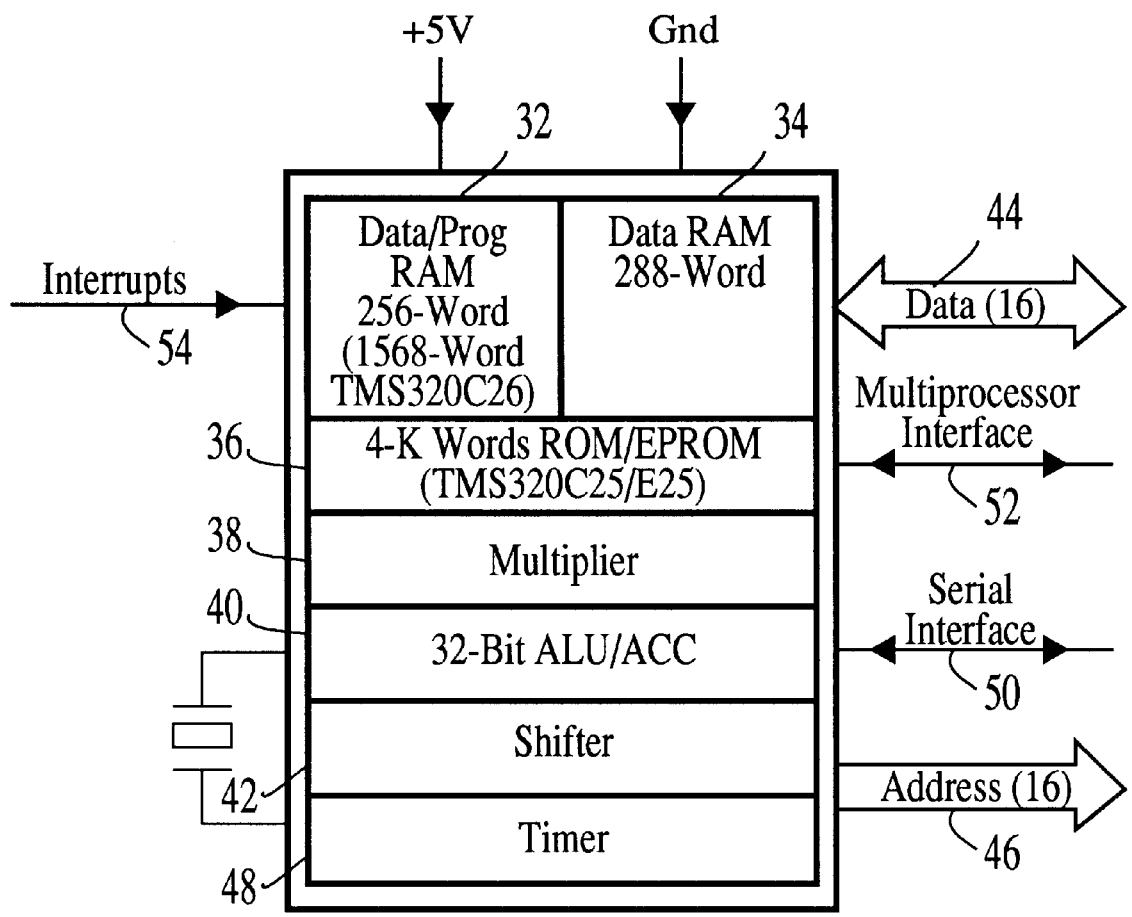
FIG. 1 is a simplified block diagram of a conventional digital signal processor.
Figure 2:
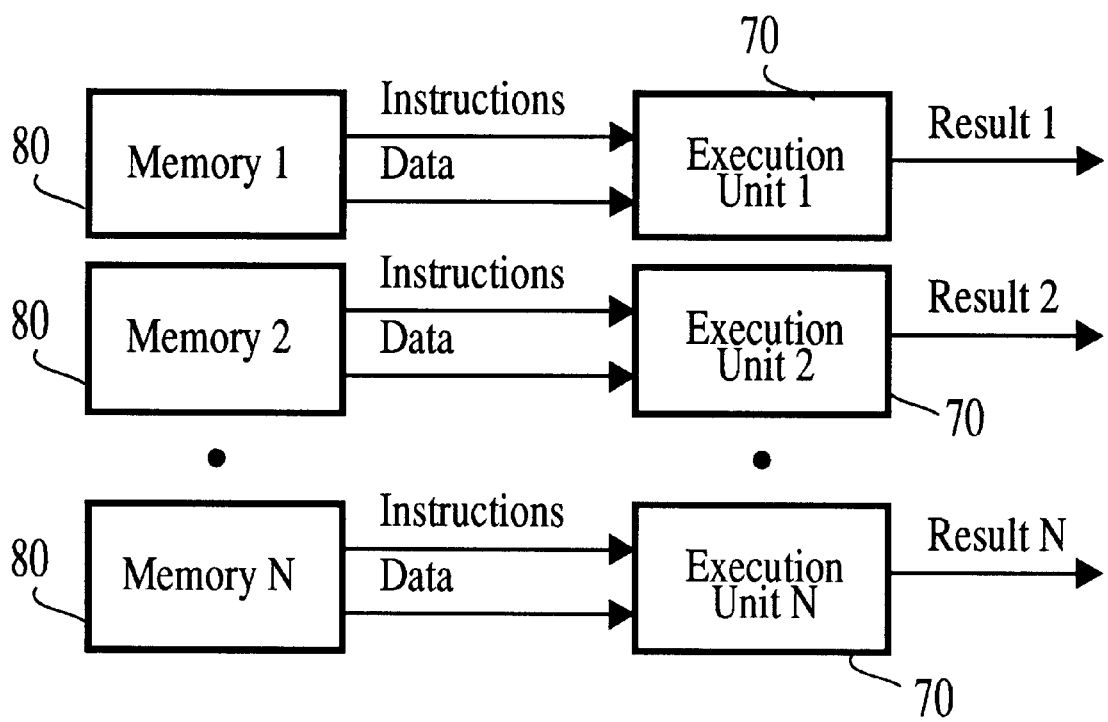
FIG. 2 shows a typical multiprocessor architecture.
Figure 3:
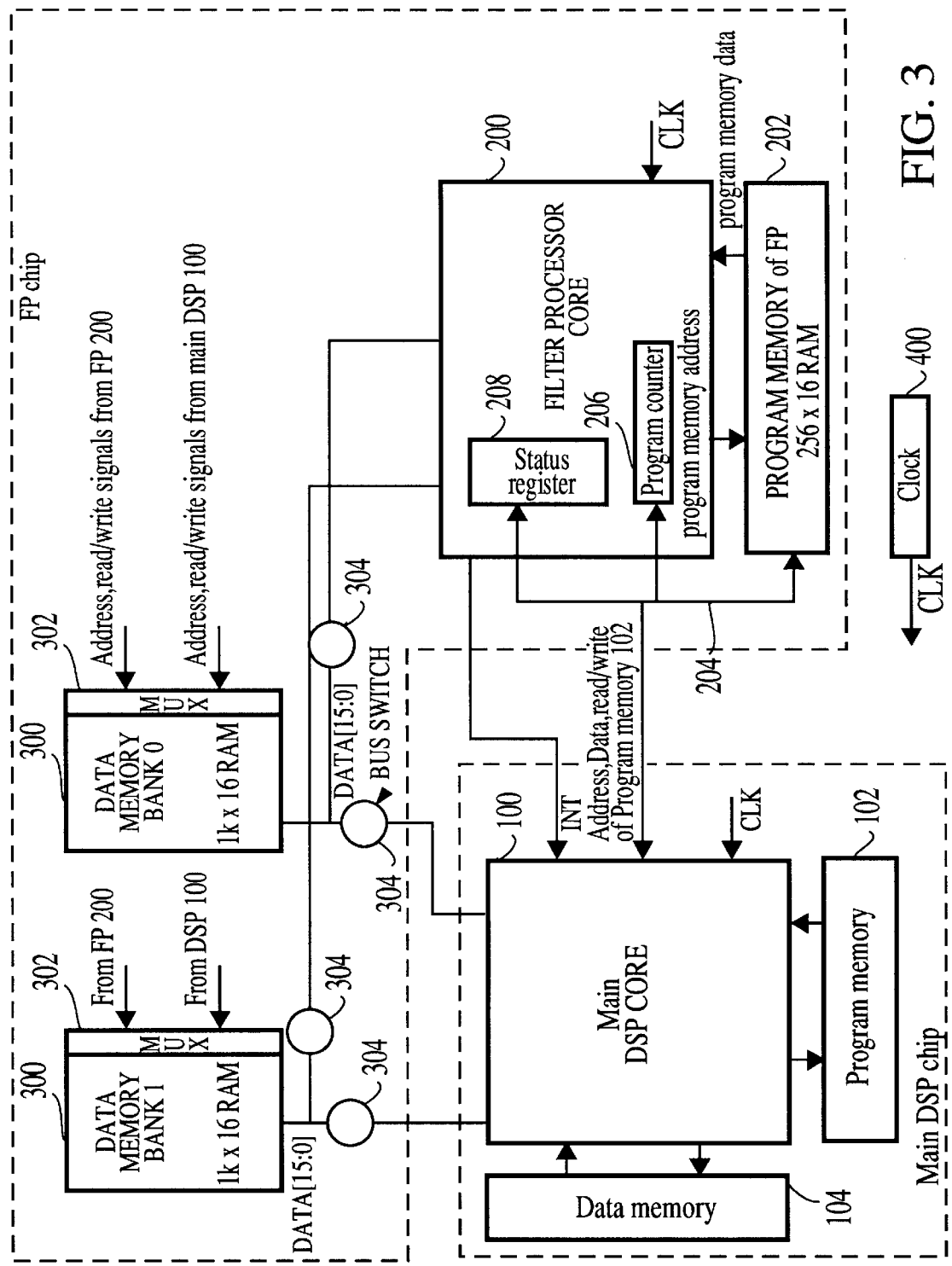
FIG. 3 illustrates interaction between a main DSP and an auxiliary filter DSP that share a common data memory in accordance with the invention.

Referring to FIG. 3, a main DSP 100 having a program memory 102 and a data memory 104 interacts with an auxiliary filter processor (FP) 200 that executes filter routines for modem application. The main DSP 100 may be implemented by a 16 bit DSP core having a Harvard-type architecture discussed above in connection with FIG. 1. The Harvard-type architecture maintains separate program and data memory spaces supported by independent buses. The program and data memories 102 and 104 can be arranged on a chip of the main DSP 100, or may be connected externally with respect to the main DSP chip. Alternatively, the memory arrangement can comprise a combination of on-chip and off-chip memories. For example, the on-chip data memory 104 may be organized as two 2K×16 RAM blocks with separate buses. RAM or ROM devices, or a combination of RAM and ROM devices, may be used for the program memory. For example, a 15K×16 on-chip program RAM and a 48K×16 external program memory may be arranged.

The FP 200 may be also implemented by a Harvard architecture. It is provided with a program RAM 202 that may contain 256 16-bit instruction words. The program RAM 202 stores the filter process instructions supplied from the main DSP program memory 102 that has a portion for storing the instructions to be executed by the FP 200. The program RAM 202, downloadable by the main DSP 100, may be arranged on a chip of the FP 200; however an external program RAM device also may be used.

To provide the main DSP 100 with the ability to load the filter process instructions from the main DSP program memory 102 into the FP program memory 202, the program memory 202 is mapped to the main DSP program memory space 102. The random access to the program memory 202 allows the main DSP 100 to reload the program RAM 202 with the required filter program.

A filter library comprising numerous filter routines is stored in the program RAM 202. After downloading the appropriate filter program or several programs to the program RAM 202 via a FP program memory interface 204, the main DSP 100 supplies a program counter 206 and status register 208 of the FP 200 with the control data required to initiate execution of the filter program.

To prevent the FP 200 from fetching instructions from its program memory 202 when the memory is accessed by the main DSP 100, the FP 200 is supplied by the main DSP 100 with a program memory busy signal. The FP 200 delays fetching the instructions until this signal is deasserted. The structure of the FP 200 and, in particular, the FP program memory interface 204 involved in the interaction between the main DSP 100 and the program RAM 202 of the FP 200 are disclosed in more detail later.

To minimize the time spent in exchanging command and data between the main DSP 100 and FP 200, they are allowed to share a data memory (RAM) 300. As shown in FIG. 3, the data memory 300 may be provided on the chip of the FP 200, and is organized as two 1K×16 RAM blocks BANK1 and BANK0 with separate buses so that two operands required for multiplication can be fetched in the same clock cycle. These two 1K×16 data RAM blocks are mapped to lower 1K address locations of each of the main DSP data RAM blocks 104. Alternatively, the data memory 300 may be arranged externally with respect to the main DSP and FP chips.

The data RAM 300 can be used to store both 16 bit and 32 bit words. As discussed in more detail later, a 32 bit word in the data RAM is assumed to be formed by the RAM BANK1 supplying the bits 31 to 16, and by the RAM BANK0 supplying the bits 15 to 0. Each of the RAM blocks 300 is provided with a multiplexer 302 that allows the main DSP 100 and FP 200 to access the data RAM. Each of the multiplexers 302 is supplied with address and read/write control signals from both the processors 100 and 200 to support data transfers to and from the data RAM. An arbitration scheme is implemented to give the FP 200 access to the data RAM 300 only when the main DSP 100 is not using the data RAM 300. Bus switches 304 are arranged on each data bus to control the data memory access. Also, the data memory 300 can be used to pass both commands and data between the main DSP 100 and FP 200.

A clock source 400 supplies both main DSP 100 and FP 200 with a common clock signal CLK to provide synchronization between the main and auxiliary processors 100 and 200. At the end of the current filter program execution, the FP 200 may generate an interrupt signal INT to the main DSP 100. Alternatively, the main DSP may poll the status register 208 of the FP 200 to determine whether the filter program execution is completed.

Figure 4:
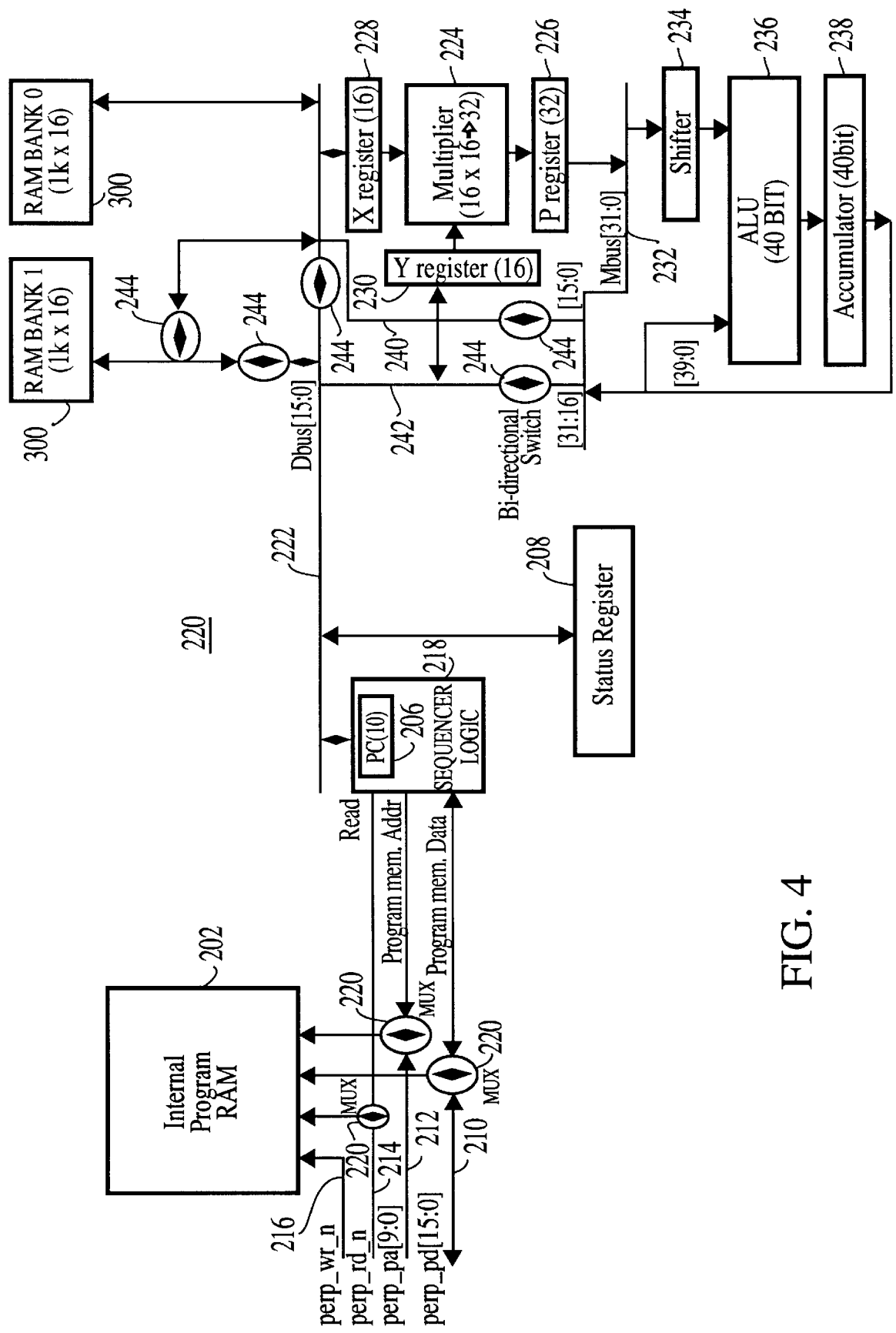
FIG. 4 is a simplified data path block diagram of the auxiliary filter DSP shown in FIG. 3.

Reference is now made to FIG. 4, wherein a simplified data path block diagram of the FP 200 is shown. As discussed above, the main DSP 100 uses the FP program memory interface 204 in its communication with the FP 200. In particular, the FP program memory interface 204 comprises a 16 bit data bus "perp_pd[15:0]" 210 that allows the main DSP 100 to provide data reading and writing, and allows the FP 200 to read data. A 10 bit address bus "perp_pa[9:0]" 212 supports the main DSP read/write operations and the FP read transactions.

The FP program memory 202 is physically mapped to the main DSP program memory 102 to provide address correspondence between locations of the FP program memory 202 and the locations in the portion of the main DSP program memory 102 that stores filter process instructions. The address bus 212 allows the main DSP 100 to supply the FP program memory 210 with address signals indicating the main DSP program memory locations from which the filter process instructions are loaded. As a result, the main DSP 100 can download the filter process instructions from its program memory 102 to the FP program memory 202. The FP 200 can fetch these instructions from its program memory 202 to execute them. A read enable line "perp_rd_n" 214 and write enable line "perp_wr_n" 216 allow the main DSP 100 to control data exchange between the main DSP program memory 102 and the FP program memory 202.

Figure 5:
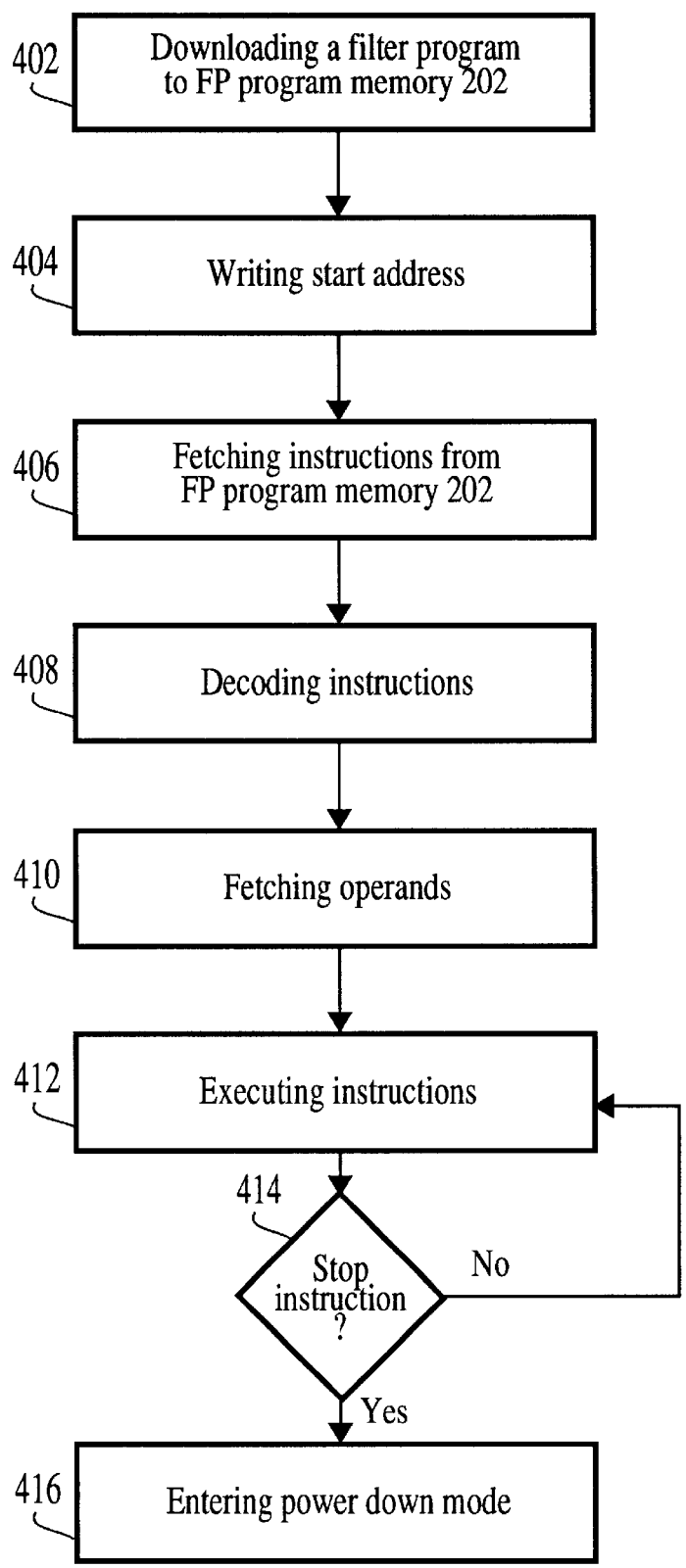
FIG. 5 is a flow-chart summarizing the operation of the multi-DSP system shown in FIG. 3.

Referring to FIG. 5, operation of the system for implementing a filtering algorithm is as follows. The main DSP 100 downloads appropriate filter program or programs to the FP program memory 202 (step 402), and writes via the address bus 212 to the FP program counter 206 the start address from which to begin execution (step 404). Alternatively, the main DSP 100 can write to the status register 208 a busy execution bit BEX to enable the FP 200 to start execution from the program memory location indicated by the FP program counter 206. The BEX bit is reset to LOW after finishing the execution.

The 10 bit program counter can be arranged in a program sequence logic unit 218 that controls program flow and generates control signals to various data path units to perform the instruction execution. Multiplexers 220 arranged on the buses 210, 212 and 214 allows the sequence logic to manage access to the program RAM 202. The 15 bit status register 208 stores control bits used for the instruction execution.

All instruction executions are pipelined with a four stage pipeline: 1) fetch instructions from the program memory 202 (step 406), 2) decode them (step 408), 3) fetch corresponding operands from the data memory 300, program memory 202 or FP register space (step 410), and 4) execute the instructions (step 412). The FP 200 continues execution of the instructions from its program memory 202 until it sees a STOP instruction (step 414).

Executing the STOP instruction will cause the FP 200 to halt the instruction execution and enter a power down mode (step 416). In this mode, the FP 200 gates its clock input CLK off.

An enable interrupt bit EINT in the status register 208 may define whether the FP 200 will send interrupt INT to the main DSP 100 after finishing the instruction execution. For example, if the EINT bit is set to 1, the interrupt will be sent to the main DSP 100. In response the main DSP sets the EINT bit in the status register 208 to 0, in order to reset interrupt and start next execution. Alternatively, the main DSP 100 can write a new address into the program counter 206 to reset interrupt and start next execution.

If the EINT bit is set to 0, the interrupt will not be sent after finishing the instruction execution. In this case, the main DSP 100 may check the BEX bit in the status register 208 to determine whether the execution is finished.

To provide instruction execution, the sequence logic unit 218, status register 208 and data RAM blocks 300 are attached to a 16 bit data bus 222. As discussed above, the data RAM is organized as two 1K×16 RAM blocks BANK1 and BANK0 so that the two operands required for multiplication can be fetched in the same clock cycle. While at least one of the operands for multiplication comes from one of the two data RAM blocks, the other operand may come from the program memory 202 or register space. The data RAM 300 can be used to store both 16 bit and 32 bit words. For example, the RAM BANK1 may supply the bits 31 to 16 of a 32 bit word, the RAM BANK0 may supply the bits 15 to 0 of these word.

A multiplier 224 performs 16 bit×16 bit 2's complement multiplication of the fetched operands and forms a 32 bit product in a single clock cycle. The multiplier 224 can support signed multiplication. The formed product is supplied to a 32 bit P (product) register 226. The operands for multiplication are provided by a 16 bit X register 228 and 16 bit Y register 230. Through a 32-bit multiplier M bus 232 and scaling shifter 234, operands are supplied to one of inputs of an arithmetic logic unit (ALU) 236 that can perform 40 bit operations. For example, the ALU 236 can add a 32 bit sign-extended value from the P register 226 to a 40 bit value supplied by an accumulator 238 to a second input of the ALU 236. All load, arithmetic and logical operations in the accumulator 238 can be 40 bit operations. Buses 240 and 242 connects the M bus 232 to the 16 bit data bus 222. For example, the bus 240 may supply bits 15 to 0 of a 32 bit word, and the bus 242 may supply bits 31 to 16 of this word. Bi-directional bus switches 244 are provided to handle data transfer on the corresponding buses depending on the instructions being executed.

The machine code for the FP instructions is different from the machine code for the main DSP instructions. However, functionality of the instructions for both processors is very similar. Hence, it is relatively easy for a programmer to write code for both processors. The compatibility between the processors 100 and 200 at a machine code level can be handled by the assembler.

The disclosed multiprocessor architecture allows both processors to operate concurrently. As a result, the dual DSP system speed of processing can be two times more than the single DSP speed, assuming that both main DSP 100 and FP 200 are running at the same clock speed simultaneously. Also, sharing the data memory by both processors and mapping the FP program memory to the main DSP program memory reduce communication bottlenecks inherent in a multiprocessor architecture.

What is claimed is:

1. A multiprocessor computer system, comprising:
    a main digital signal processor (DSP);
    at least one auxiliary DSP interacting with said main DSP for executing digital signal processing operations;
    a data memory shared by said main DSP and one or more auxiliary DSPs,
    a main DSP program memory storing program data of said main DSP and processing instructions to be executed by said auxiliary DSP; and
    a separate auxiliary DSP program memory mapped into the memory space of said main DSP for storing said processing instructions.

2. The system of claim 1, wherein said main DSP and auxiliary DSP are controlled by a common clock signal.

3. The system of claim 1, wherein said main DSP program memory is arranged on a main DSP chip.

4. The system of claim 1, wherein said auxiliary DSP program memory is arranged on an auxiliary DSP chip.

5. The system of claim 4, wherein said data memory is arranged on the auxiliary DSP chip.

6. The system of claim 1, wherein said auxiliary DSP comprises a program sequence unit for enabling said main DSP to access said auxiliary DSP program memory for writing said processing instructions.

7. The system of claim 6, wherein said program sequence unit enables said auxiliary DSP to access said auxiliary DSP program memory for reading said processing instructions.

8. The system of claim 1, wherein said auxiliary DSP is prevented from access to said data memory when said main DSP uses said data memory.

9. The system of claim 1, wherein said auxiliary DSP executes filter process operations.

10. In a multiprocessor computer system having a main DSP with a main DSP program memory and an auxiliary DSP with an auxiliary DSP program memory wherein said auxiliary DSP program memory being mapped to said main DSP program memory space, a method of digital signal processing, comprising the steps of:
    (a) controlling said main DSP to download processing instructions from said main DSP memory to said auxiliary DSP memory;
    (b) controlling said main DSP to enable said auxiliary DSP to fetch said processing instructions from said auxiliary DSP memory, and
    (c) controlling said auxiliary DSP to carry out operations to execute said processing instructions.

11. The method of claim 10, wherein said step (b) comprises controlling said main DSP to supply to said auxiliary DSP, a start address in said auxiliary DSP program memory from which to begin execution of said processing instructions.

12. The method of claim 10, wherein said step (b) comprises controlling said main DSP to supply to said auxiliary DSP, a control signal to start execution of said processing instructions from a predetermined location in said auxiliary DSP program memory.

13. The method of claim 10, wherein said auxiliary DSP is controlled to supply to said main DSP, an interrupt to indicate that the operations are completed.

14. The method of claim 10, wherein said main DSP is controlled to check a status signal provided by said auxiliary DSP to determine whether the operations are completed.

15. The method of claim 10, wherein said main DSP and said auxiliary DSP share a data memory.

16. The method of claim 10, wherein said auxiliary DSP carries out filter process operations.

17. The method of claim 10, wherein said main DSP and auxiliary DSP are controlled by a common clock signal.

18. The method of claim 10, wherein said auxiliary DSP is prevented from access to said auxiliary DSP program memory when said auxiliary DSP program memory is accessed by said main DSP.

* * * * *